No. 878,761. PATENTED FEB. 11, 1908.
J. L. ALLEN.
STUFFING MACHINE.
APPLICATION FILED NOV. 24, 1906.
3 SHEETS—SHEET 1.
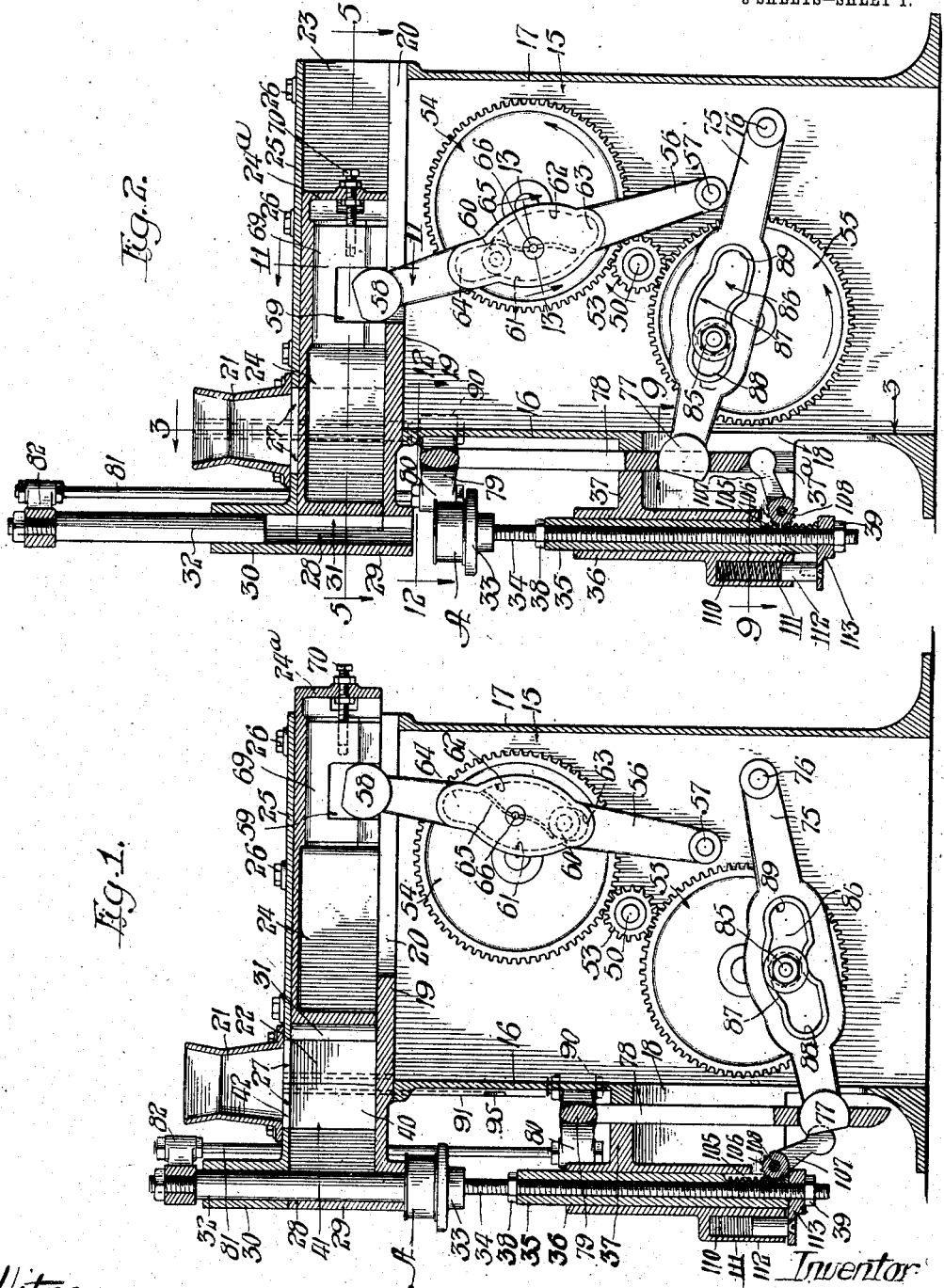
Witnesses:
Inventor:
John L. Allen
by Poole Brown.
Attys.

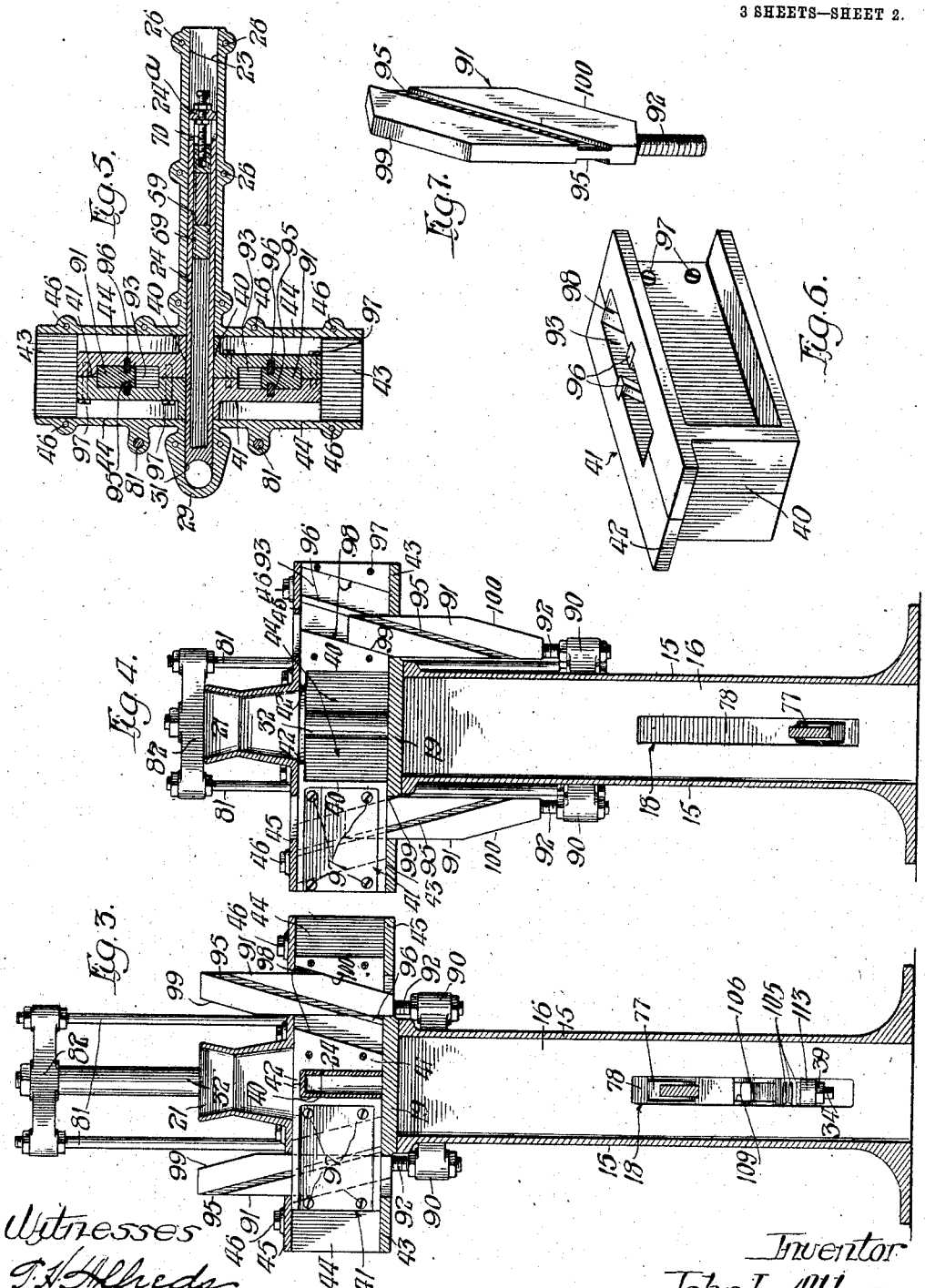

No. 878,761. PATENTED FEB. 11, 1908.
J. L. ALLEN.
STUFFING MACHINE.
APPLICATION FILED NOV. 24, 1906.
3 SHEETS—SHEET 3.
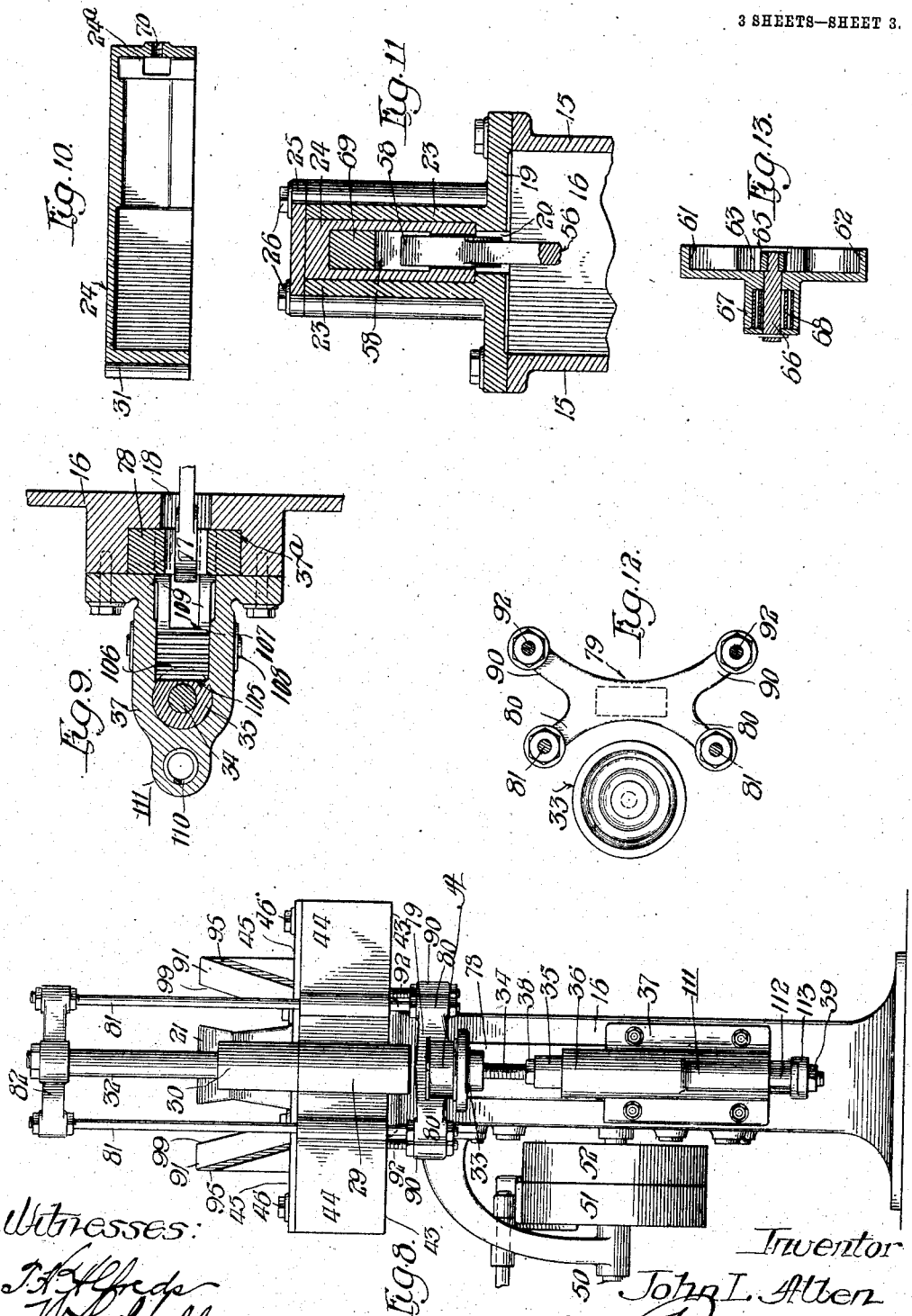

UNITED STATES PATENT OFFICE.

JOHN L. ALLEN, OF CHICAGO, ILLINOIS.

STUFFING-MACHINE.

No. 878,761.　　　　Specification of Letters Patent.　　　　Patented Feb. 11, 1908.

Application filed November 24, 1906. Serial No. 344,915.

*To all whom it may concern:*

Be it known that I, JOHN L. ALLEN, a citizen of the United States, and a resident of Chicago, in the county of Cook and State of Illinois, have invented certain new and useful Improvements in Stuffing-Machines; and I do hereby declare that the following is a full, clear, and exact description thereof, reference being had to the accompanying drawings, and to the letters of reference marked thereon, which form a part of this specification.

This invention relates to improvements in stuffing machines for stuffing meats or other material of prescribed weights or quantities in cans.

Among the objects of the invention is to produce a simple and efficient machine for the purpose set forth and the invention consists in the matters hereinafter set forth and more particularly pointed out in the appended claims.

As shown in the drawings:—Figure 1 is a vertical section of a meat stuffing machine made in accordance with my invention, showing the stuffing plunger in its lowermost position and the feed plunger retracted. Fig. 2 is a like section showing the stuffing plunger in its uppermost position and the feed plunger advanced. Fig. 3 is a vertical transverse section taken on line 3—3 of Fig. 2. Fig. 4 is a similar view showing the parts in changed position. Fig. 5 is a horizontal section, taken on line 5—5 of Fig. 2. Fig. 6 is a perspective view of one of the slides constituting the movable side walls of the feed chamber. Fig. 7 is a perspective view of one of the slide actuating cam bars. Fig. 8 is an end view of the machine. Fig. 9 is a horizontal section taken on line 9—9 of Fig. 2. Fig. 10 is a longitudinal vertical section of the feed plunger. Fig. 11 is a transverse vertical section taken on line 11—11 of Fig. 2, showing parts in elevation. Fig. 12 is a horizontal section taken on line 12—12 of Fig. 2. Fig. 13 is a detail section taken on line 13—13 of Fig. 2.

The supporting frame of the machine comprises vertical side plates 15, 15 and front and rear walls 16, 17, respectively, said walls being suitably joined to constitute a hollow supporting casing or standard that incloses some of the operative parts of the machine. The front wall is provided with a vertical slot 18. The top wall 19 of the supporting frame is provided with a longitudinal slot 20. Said wall constitutes the bottom wall of the feed and feed plunger chamber, as well as the support for the stuffing chamber, as will hereinafter appear.

21 designates a hopper into which the meat or other material to be stuffed into the cans is fed. Said hopper is located over a receiving chamber 22 (Fig. 1) that is formed between parallel side plates 23, 23 (shown best in Fig. 11) rising from and made integral with the plate 19, as herein shown. The said side plates extend from front to rear of the machine and constitute side guides for a feed plunger 24 which reciprocates through the feed chamber. A plate 25 secured to the side walls 23 by screw-bolts 26 constitutes the top wall of the receiving and plunger chamber and the plate 19 constitutes the bottom wall thereof. It is on the plate 25 that the hopper is supported, the plate being provided with an opening 27 through which the material passes from the hopper to the meat chamber 22. 28 designates, as a whole, the stuffing chamber located at the front of the machine and formed principally within a forward extension 29 of the casting which partially incloses the feeding and plunger chamber before referred to and a vertical tubular extension 30 formed integral with the upper wall plate 25 of said chamber. The said stuffing chamber is circular in cross-section and is arranged vertically. The interior wall thereof is formed partly by the rounded end 31 of the feed plunger 24, as more clearly shown in Figs. 2 and 5, the said forward end of the plunger being formed with a vertical, transversely concave recess that is curved on the same radius as the part of the wall formed in the castings 29 and 30. The material is fed into the receiving chamber 22 at a time when the feed plunger is in its back stroke and during the forward or advance stroke the material is fed to the plunger chamber, of which the front end of the feed plunger constitutes a part; the feed plunger being held in its advance position until the material is forced from the stuffing chamber.

32 designates the stuffing plunger which is reciprocated vertically through the stuffing chamber by mechanism hereinafter to be described. The parts are so arranged that the stuffing plunger 32 occupies its uppermost position while the feed plunger is retracted, as shown in Fig. 2, to admit the material being fed into the receiving chamber in advance of the feed plunger, and the stuffing plunger remains retracted until the feed plunger reaches the forward limit of its travel. The feed plunger remains stationary during the descent of the stuffing plunger and is retracted after the stuffing is effected.

33 designates a can holding chuck that receives and holds the can A which is to be stuffed with material from the stuffing chamber 28. Said chuck is located vertically and axially below the stuffing chamber. It is supported on the upper end of a screw-threaded shaft 34 that extends through and is locked to a sleeve 35 which has vertical movement in the tail stock 36 that is formed on or made integral with a bracket 37 extending forwardly from the front wall 16 of the supporting frame. The shaft is locked in the sleeve by upper and lower nuts 38 and 39, respectively, which have screw-threaded engagement with the shaft whereby the shaft and chuck carried thereby may be vertically adjusted relatively to the sleeve. The said sleeve and the shaft 34 carried thereby are raised at the proper periods in the movements relatively to the other parts of the machine to bring the can with its mouth over the discharge end of the stuffing chamber, and in position to receive material forced therefrom.

The side walls 40, 40 of the receiving chamber are formed by the flanged inner ends of laterally reciprocating slides, designated as a whole by 41 and shown detached in Fig. 6, said slides being arranged to be moved away from each other at the time the plunger is retracted, and thereby facilitate the reception of the material thereto and being arranged to be moved towards each other in positions a proper distance apart to constitute the side walls of the chamber just before the plunger commences to advance, thereby forming guides for said plunger as it moves through the receiving chamber. The said slides 41 are provided at their adjacent ends, at their upper sides, with inwardly projecting flanges 42 which, when the slides are moved together, close the opening 27 between the hopper and the receiving chamber. The said slides are supported and reciprocate through laterally directed wings or extensions 43 which are made integral with the plate 19. The slides reciprocate between guide plates 44 made integral with and extending upwardly from the wings 43, and top plates 45 attached to the side plates 44 by screw-bolts 46 hold the slides from rising. Mechanism is provided which actuates the slides 41 to move the same inwardly and outwardly in unison with the flanges 24 and 32 in such manner that they are separated, as shown in Fig. 4, at the time the feeding and stuffing plungers are retracted, and are moved inwardly towards each other just before the feed plunger advances.

The mechanism for actuating the various operative elements of the machine will now be described.

50 designates the main shaft of the machine provided with fast and loose pulleys 51 and 52 and mounted in suitable bearings in the machine frame. The said shaft is provided within the hollow frame with a fixed pinion 53 that meshes with two geared disks 54, 55 from the former of which the feed plunger is actuated and from the latter of which the other parts of the machine are actuated.

The means for actuating the feed plunger from the disk 54 comprises a vertically swinging lever 56 that is pivoted or hinged at its lower end to a pin 57 extending transversely across the casing support and extends at its upper end through the slot 20 of the plate 19 into the feed plunger chamber. The said lever is provided at its upper end with a head 58 that engages a downwardly opening recess in the feed plunger, whereby swinging motion of the lever, transmitted thereto by the disk 54, produces reciprocatory motion to the feed plunger. The lever is swung about the pin 57 through the medium of a crank-pin 60 on the disk which engages a suitably shaped cam chamber formed in the lever 56. The side walls of said cam chamber comprise oppositely disposed concentric portions 61, 62 (Figs. 1 and 2) and the oppositely arranged eccentric portions 63, 64, respectively. The said cam chamber is divided into two parts to constitute, in effect, two cam grooves by means of a swinging, spring pressed plate 65 that is mounted on a pin 66 (Figs. 1, 2 and 13) that extends outwardly through a hub or sleeve 67 formed integral with the lever. The said plate 65 is fixed to the pin 67 and is placed under the influence of a volute spring 68 surrounding the pin within the hub 67 and fixed at one end to said pin and at its other end to the hub. The plate 65 engages at one end the wall of the cam chamber and the spring 68 tends to hold said end against said wall. The wall thus serves as an abutment to hold the plate in normal position. The plate thus arranged and mounted permits the crank-pin 60 to pass from one side thereof to the other during the rotation of the disk. While the crank-pin 60 is passing in contact with the concentric portion 61, the feed plunger is held in its advanced position, and while said pin is passing in contact with the opposite concentric portion 62 of the cam chamber said feed plunger is held in its rearmost position, as shown in Fig. 1. The feed plunger is advanced during the movement of the crank-pin through the eccentric portion 64 of said cam chamber and is retracted during the movement of said crank-pin through the eccentric portion 63 thereof, as is obvious.

In order to properly adjust the throw of the feed plunger to the movement of its actuating mechanism, I have provided an adjusting device in the plunger which is made as follows: The recess 59 which receives the head 58 of the actuating lever 56 is formed in a block 69 that is separate from and mounted in the rear end of the plunger, which latter is made hollow. The block is adjusted towards and away from the rear wall 24ᵃ of said plunger by means of an adjusting screw 70 that is rotative but endwise immovable in the wall and has screw-threaded engagement with a screw-threaded socket in the rear end of said block, as clearly shown in Figs. 1 and 2.

The lower geared disk 55 actuates the stuffing plunger and the laterally movable walls of the receiving chamber, as well as the chuck 33, by mechanism which will now be described.

75 designates a vertically swinging lever that is hinged at its rear end to a pin 76 extending transversely across the casing. The lever extends at its forward end through the vertical slot 18 in the front wall 16 of the supporting frame and is provided at its forward end with a headed portion 77.

78 designates a vertical slide bar in front of the wall 16 that has sliding engagement in grooves 37ᵃ formed in the bracket 37. The said slide bar is provided in line with said slot 18 with a socket which receives the headed end of the lever 78, thus establishing operative engagement between said parts. The slide bar is provided at its upper end with a cross-head 79, and said cross-head is provided with oppositely and laterally extending arms 80, 80, (Figs. 8 and 12).

81, 81 designate vertical rods that rise from and are fixed at their lower ends to the outer ends of said arms 80 of the cross-head. Said rods 81 are attached at their upper ends to the opposite ends of a cross-head 82 that is fixed centrally to the upper end of the stuffing plunger 32 (Fig. 8). Reciprocation of the lever 75, therefore, acts through the medium of the slide 78 and the rods 81 to reciprocate the stuffing plunger downwardly and upwardly once during each rotation of the disk 55.

The connection between the disk and the plunger comprises an eccentric or crank-pin 85 on the disk 55 that engages a cam slot 86 formed in the lever. The cam surfaces of said slot are composed of a concentric portion 87 and eccentric portions 88 and 89. While the concentric portion is engaged by the crank-pin, the stuffing plunger remains in its uppermost position. The plunger is depressed while the crank-pin is passing through the eccentric portion 88 of said slot and is elevated during the time the crank-pin is passing through the eccentric portion 89 of the slot.

The slides 41, the inner ends of which constitute the side walls of the receiving chamber, are also given motion through the vertical reciprocation of the slide bar 78 by the following connecting mechanism: The cross-head 79 of said slide is provided with arms 90, 90, corresponding generally to the arms 80. Fixed to said arms are the lower ends of sliding cam bars 91, 91. The said cam bars are provided at their lower ends with screw-threaded studs 92 which extend through openings in the arms 90 of the cross-head 79 and are secured to said cross-pin by suitable screw-threaded nuts. The said cam blocks therefore have a vertically reciprocating movement. They extend upwardly through openings 93 in the slides and are adapted to reciprocate therethrough and through upper and lower openings in the bottom and top walls 43, 45 of the chamber through which said slides reciprocate. The said slide bars are provided at their sides with inclined cam grooves 95 arranged obliquely to the path of movement of said slides, and said grooves are adapted for engagement by correspondingly inclined ribs 96, 96, arranged one in each side wall of the opening 93 of each block. Said ribs are made of steel and are fixed in grooves or recesses which open into said openings 93 in any suitable manner. Conveniently, said blocks 41 are made of two like cast-metal parts which are fastened together by means of screws 97, this construction facilitating the assemblage of the parts. The said openings 93 in said blocks are provided with parallel inclined end walls 98 which are parallel with the ribs 96. The said cam bars 91 are provided at their upper inner margins with inclined portions 99 and at their outer margins with other inclined portions 100, parallel with the inclined margins or portions 99 and also with the inclined end walls 98 of said openings 93. The grooves of the two cam bars converge downwardly when assembled, one on each side of the machine, as clearly shown in Figs. 3 and 4. With this construction it will be observed that when the cam bars are in their uppermost positions, as shown in Fig. 3, the slides occupy their innermost positions and that when said cam bars are lowered, the co-action of said cam grooves 95 with the bars 96 operates to shift said slides outwardly to the position shown in Fig. 4.

The mechanism for raising the can chucks from the position shown in Fig. 2 to that shown in Fig. 1 is operated through the medium of the slide 78 and is made as follows: The sleeve 45 through which the shaft 34 extends is provided at its lower rear side with a short rack 105 that is engaged by a gear-segment 106 formed on or carried by a swinging lever 107 rotatively mounted on a transverse pin 108 mounted in the tail stock bracket 37. The lever is bifurcated at its rear end, as shown most clearly in Fig. 9, and the arms 109 thereof are disposed in planes, one at each side of the socket in the slide bar 78 that receives the headed end of the actuating lever 75. When the slide bar 78 occupies its uppermost position, the fork arms of the lever are located below the lower end of said bar, as shown in Fig. 2, the chuck 33 and its supporting devices being at this time in their lowermost positions. The said lower end of the slide bar is rounded and the rear ends of said fork arms are correspondingly rounded. When the slide is depressed, through the action of its actuating lever 75, the rear end of said lever 107 is swung downwardly, the rounded ends of the fork-arms of said lever sliding in contact with the front face of the slide bar on each side of the head 77 of said actuating lever. During the downward swing of the lever 107, the gear segment acts on the rack 105 to force the sleeve 36 and the parts carried thereby upwardly, thus moving the chuck with a can thereon into the position shown in Fig. 1. In order to quickly retract the chuck and thereby permit a filled can to be properly removed, after pressure of said lever is relieved, means are provided as follows: 110 designates a spirally expansively acting spring that is mounted in a suitable downwardly opening casing 111 carried by the tail stock (Fig. 2). 112 designates a short plunger that extends into the lower open end of the casing 111 and engages the lower end of the spring. Said plunger 112 is fixed to and rises from a short arm or bracket 113 through which the shaft 34 extends, and the arm is fixed between the sleeve 35 and the lower nut 39 thereof. With this construction, it will be noted that the spring is placed under compression when the chuck is moved upwardly by the mechanism described, and it serves to promptly and positively retract the chuck as the lever 75 begins to raise the slide bar upwardly.

The operation of the machine thus described will be clearly understood but may be briefly recapitulated as follows: The material to be stuffed in the can is fed into the receiving chamber through the hopper at a time when the plunger is retracted, as shown in Fig. 1, and at this time the slides 41 occupy their outermost positions as shown in Fig. 4. The first operation of the parts thereafter is the movement of the slides inwardly to the position shown in Fig. 3, and at the same time the stuffing plunger 32 is moved upwardly by the same actuating mechanism. After said slides 41 have been moved inwardly, the feed plunger is advanced and is held in its advance position until after the stuffing plunger 32 descends to force the material from the stuffing chamber into the can below, which latter has theretofore been raised upwardly by the chuck actuating mechanism. During the descent of the stuffing plunger also the blocks 41 are moved outwardly so that another charge of material may be fed into the feeding chamber as soon as the feeding plunger has retired in rear of the hopper. Thereafter, the said slides 41 are moved inwardly and the feed plunger is advanced to force another charge of material to the stuffing chamber as before. The movements of the parts described are repeated so long as the machine is continued in operation.

I claim as my invention:—

1. A stuffing machine comprising a vertical stuffing chamber, a plunger reciprocating therethrough, a receiving chamber having side walls which are movable towards and from each other to compress the charge of material delivered thereto, a feed plunger reciprocating horizontally through the receiving chamber to deliver the compressed material to the stuffing chamber, the forward end of the plunger being transversely concave to constitute, when said plunger is at the forward limit of its throw, a portion of the wall of the stuffing chamber, and means for holding a can in position to receive material from the lower end of the stuffing chamber, the stuffing chamber being made of uniform diameter throughout its length and the parts being so arranged that the plunger reciprocates entirely to the lower end of said stuffing chamber to force each charge of material wholly from said chamber to a can held beneath the same.

2. A stuffing machine comprising a vertical stuffing chamber of uniform diameter throughout its length, means for holding a can thereunder in position to receive material from said chamber, a plunger reciprocating in said chamber, mechanism for operating said plunger constructed to reciprocate the plunger entirely through the discharge end of the chamber to force the material wholly from the chamber into a can held beneath the same, a horizontal receiving chamber, slides constituting the side walls of said receiving chamber and arranged to move inwardly to compress the material delivered thereto, and means for delivering the compressed material from the receiving to the stuffing chamber.

3. A stuffing machine comprising a stuffing chamber, a plunger reciprocating therethrough, a receiving chamber and a feed plunger reciprocating through the latter chamber to deliver the material to the stuffing chamber, the advance end of the feed plunger constituting, when at the forward limit of its throw, part of the plunger chamber, and means for actuating said feed plunger comprising a lever pivoted at one end, said lever being provided centrally with a cam recess provided with two opposing concentric cam surfaces and with two opposing eccentric surfaces, a swinging plate between said concentric surfaces, and a crank-pin extending into said recesses.

4. A stuffing machine comprising a stuffing chamber, a plunger reciprocating therethrough, a receiving chamber and a feed plunger reciprocating through the latter chamber to deliver the material to the stuffing chamber, the advance end of the feed plunger constituting, when at the forward limit of its throw, part of the plunger chamber, and means for actuating said feed plunger comprising a lever pivoted at its lower end, means engaging the lever between its ends to swing the same, the plunger being made hollow, a block located in the hollow plunger and provided with a downwardly opening recess to receive the upper end of the lever and an adjusting screw for adjusting said block in said plunger.

5. A stuffing machine comprising a vertical stuffing chamber, a plunger reciprocating therethrough, a receiving chamber, a feed plunger reciprocating horizontally through the feed chamber to deliver material to the stuffing chamber, the forward end of the plunger being transversely concave to constitute, when said plunger is at the forward limit of its throw, a portion of the wall of the stuffing chamber, means for compressing the material in the receiving chamber prior to the operation of the feed plunger, and means for holding a can in position to receive material from the lower end of the stuffing chamber, the stuffing chamber being made of uniform diameter throughout its length and the parts being so arranged that the plunger reciprocates entirely to the lower end of said stuffing chamber to force each charge of material wholly from said chamber to a can held beneath the same.

6. A stuffing machine comprising a stuffing chamber, a plunger reciprocating therethrough, a receiving chamber, a feed plunger reciprocating through the receiving chamber towards and from the stuffing chamber, and slides movable toward and from each other and adapted at their adjacent ends to constitute the side walls of the receiving chamber.

7. A stuffing machine comprising a stuffing chamber, a plunger reciprocating therethrough, a receiving chamber, a feed plunger reciprocating through the receiving chamber towards and from the stuffing chamber, slides movable toward and from each other and adapted at their adjacent ends to constitute the side walls of the receiving chamber and a hopper located over and communicating with said receiving chamber, said slides being provided with projecting parts or flanges which, when the slides are moved inwardly are brought together to close the hopper opening.

8. A stuffing machine comprising stuffing mechanism, a receiving chamber, a plunger reciprocating therethrough to deliver material from the receiving chamber to the stuffing mechanism, a hopper through which material is delivered to said receiving chamber, and slides movable toward and from each other, the inner ends of which constitute the side walls of the receiving chamber.

9. A machine for the purpose set forth comprising stuffing mechanism, a receiving chamber, a plunger reciprocating therethrough to deliver material from the receiving chamber to the stuffing mechanism, a hopper through which material is delivered to said receiving chamber, and slides movable toward and from each other, the inner ends of which constitute the side walls of the receiving chamber, said slides being provided at their adjacent ends with projections or flanges which are brought together to close the opening between the hopper and the receiving chamber before the plunger reciprocates through the receiving chamber.

10. A stuffing machine comprising a stuffing chamber, a plunger reciprocating therethrough, a receiving chamber, a feed plunger reciprocating through the receiving chamber towards and from the stuffing chamber, slides movable toward and from each other and adapted at their adjacent ends to constitute the side walls of the receiving chamber, a reciprocating slide bar, and operative connections between said bar and said slides for moving the latter towards and from each other, for the purpose set forth.

11. A stuffing machine comprising stuffing mechanism, a receiving chamber, a hopper through which the material is fed to the receiving chamber, a plunger reciprocating through the chamber to deliver material therefrom to the stuffing mechanism, slides, the inner ends of which constitute the side walls of the receiving chamber, and cam devices for moving said slides towards each other.

12. A stuffing machine comprising stuffing mechanism, a receiving chamber, a hopper through which the material is fed to the receiving chamber, a plunger reciprocating through the chamber to deliver material therefrom to the stuffing mechanism, slides, the inner ends of which constitute the side walls of the receiving chamber, and means for moving said slides toward each other comprising vertically reciprocating bars provided with inclined grooves engaging projections on the slides.

13. A stuffing machine comprising stuffing mechanism, a receiving chamber, a hopper through which the material is fed to the receiving chamber, a plunger reciprocating through the chamber to deliver material therefrom to the stuffing mechanism, slides, the inner ends of which constitute the side walls of the receiving chamber, and means for moving said slides toward each other comprising vertically reciprocating bars provided with inclined grooves and correspondingly inclined ribs on the slides engaging said grooves.

14. A stuffing machine comprising stuffing mechanism, a receiving chamber, a hopper through which the material is fed to the receiving chamber, a plunger reciprocating through the receiving chamber to deliver the material therefrom to the stuffing mechanism, slides the inner ends of which constitute the side walls of the receiving chamber, and means for moving said slides toward and from each other comprising vertically reciprocating bars, said slides being provided with openings through which said bars extend and the bars being provided with inclined grooves, and parts projecting from the slides into said openings to engage said inclined grooves.

15. A stuffing machine comprising a stuffing chamber, a stuffing plunger reciprocating therethrough, means for feeding material to said chamber, a can holding chuck located axially beneath the plunger chamber, a screw-threaded shaft on the upper end of which said chuck is mounted, a sleeve having vertically sliding movement in the tail stock of the machine to which said screw-threaded shaft is adjustably locked, means operating in unison with the plunger for raising said sleeve to bring the chuck into its operative position, comprising a rack and pinion mechanism which is operated to raise the chuck as the plunger descends, and a spring for retracting the chuck.

16. A stuffing machine comprising a stuffing chamber, a plunger reciprocating therethrough, means for feeding material to said stuffing chamber, a can holding chuck located axially below the plunger chamber, a rising and falling support for said chuck having vertical guiding movement in the tail-stock of the machine, a rack on said support, a pivoted lever provided with a gear-segment engaging the rack, and means operated by the actuating mechanism for said plunger for swinging said lever.

17. A stuffing machine comprising a vertical stuffing chamber, a plunger reciprocating therethrough, means for feeding material to said stuffing chamber, means for reciprocating the plunger, comprising a slide having vertical guiding movement in the frame, rods connecting said slide with the upper end of the plunger, means for reciprocating said slide, a can holding chuck located beneath the plunger, a support for the chuck having vertical guiding movement in the frame, means for raising said chuck as the plunger descends comprising a rack on said chuck-support, a pivoted lever provided with a gear-segment engaging the rack, said lever engaging the slide in a manner to be swung downwardly and thereby raise the chuck as the plunger slide is lowered, and a spring for depressing said chuck.

18. A stuffing machine comprising a stuffing chamber, a plunger reciprocating therethrough, means for reciprocating the plunger comprising a vertically movable slide having guiding engagement with the frame and connected with the upper end of the plunger, a receiving chamber, a feed plunger reciprocating through the receiving chamber to deliver material therefrom to the stuffing chamber, the side walls of the receiving chamber being movable toward and from each other, and means operated by said plunger slide for actuating said side walls of the receiving chamber, for the purpose set forth.

19. A stuffing machine comprising a stuffing chamber, a plunger reciprocating therethrough, means for reciprocating the plunger comprising a vertically movable slide having guiding engagement with the frame and connected with the upper end of the plunger, a receiving chamber, a feed plunger reciprocating through the receiving chamber, blocks movable toward and from each other, the adjacent parts of which constitute the side walls of the receiving chamber, and vertically movable cam bars actuated by said feed plunger slide and operatively connected with said blocks for sliding the same toward and from each other, for the purpose set forth.

In testimony, that I claim the foregoing as my invention I affix my signature in the presence of two witnesses, this 17th day of November A. D. 1906.

JOHN L. ALLEN.

Witnesses:
WILLIAM L. HALL,
GEORGE R. WILKINS.